US011645614B2

(12) United States Patent
Velten et al.

(10) Patent No.: US 11,645,614 B2
(45) Date of Patent: May 9, 2023

(54) SYSTEM AND METHOD FOR AUTOMATED FULFILLMENT OF ORDERS IN A FACILITY

(71) Applicant: Walmart Apollo, LLC, Bentonville, AR (US)

(72) Inventors: Jeremy Velten, Bella Vista, AR (US); Jason Bellar, Bella Vista, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 881 days.

(21) Appl. No.: 16/395,410

(22) Filed: Apr. 26, 2019

(65) Prior Publication Data
US 2019/0333006 A1    Oct. 31, 2019

Related U.S. Application Data

(60) Provisional application No. 62/663,450, filed on Apr. 27, 2018.

(51) Int. Cl.
*G06Q 10/08* (2012.01)
*G05B 19/418* (2006.01)
(Continued)

(52) U.S. Cl.
CPC ..... *G06Q 10/087* (2013.01); *G05B 19/41895* (2013.01); *G05D 1/0225* (2013.01); *G06Q 10/0832* (2013.01); *G05D 2201/0216* (2013.01)

(58) Field of Classification Search
CPC ............ G06Q 10/087; G06Q 10/0832; G05B 19/41895; G05D 1/0225; G05D 2201/0216
See application file for complete search history.

(56) References Cited

U.S. PATENT DOCUMENTS 6,721,762 B1    4/2004  Levine et al.
9,221,607 B2 *  12/2015  Marti ................. B29D 30/0016
(Continued)

FOREIGN PATENT DOCUMENTS

CN    104991556 A    10/2015
CN    105353759 A    2/2016

OTHER PUBLICATIONS

International Search Report and Written Opinion from related International Patent Application No. PCT/US2018/029322 dated Jul. 1, 2019.

(Continued)

*Primary Examiner* — Paul Danneman
(74) *Attorney, Agent, or Firm* — Fitch, Even, Tabin & Flannery LLP

(57) ABSTRACT

A system and a method for the automated fulfillment of retail orders in a facility is disclosed. A sorting control device aggregates a plurality of orders into a master picklist divides the master picklist into sub-picklists based on a location of the items. The sub-picklists, a first location of an item, and the location of a dock to a conveyor system are transmitted to an autonomous guided vehicle (AGV). The AGV navigates to the first location and obtains the item. The AGV iterates the sub-picklist navigating and retrieving each item. The AGV navigates to the AGV dock of a conveyor system and deposits the items at an inlet of the conveyor system. The conveyor system scans each of the items as they pass through a scan tube. Based on the scanning, each item is directed by a set of computer controlled rollers and actuated platforms to a destination isolation wing.

20 Claims, 9 Drawing Sheets

(51) Int. Cl.
   *G05D 1/02*      (2020.01)
   *G06Q 10/087*    (2023.01)
   *G06Q 10/0832*   (2023.01)

(56) References Cited

U.S. PATENT DOCUMENTS

| | | |
|---|---|---|
| 9,486,926 B2 | 11/2016 | Kawano |
| 9,600,798 B2 | 3/2017 | Battles et al. |
| 2004/0195320 A1* | 10/2004 | Ramsager ............ B07C 3/18 |
| | | 235/385 |
| 2011/0058926 A1 | 3/2011 | Winkler |
| 2013/0048722 A1* | 2/2013 | Davis ............... G07G 1/0036 |
| | | 235/383 |
| 2013/0317642 A1 | 11/2013 | Asaria et al. |
| 2014/0257553 A1 | 9/2014 | Shakes et al. |
| 2015/0073586 A1 | 3/2015 | Weiss |
| 2015/0073587 A1* | 3/2015 | Vliet ............... B65G 1/1378 |
| | | 700/216 |
| 2016/0176638 A1 | 6/2016 | Toebes |
| 2017/0088355 A1 | 3/2017 | Khodl et al. |
| 2017/0157649 A1* | 6/2017 | Wagner ............ B07C 3/008 |
| 2018/0127211 A1* | 5/2018 | Jarvis ............... G05D 1/0297 |

OTHER PUBLICATIONS

Batch Pick 'n Scan Sorter: Scanning and sorting in the smallest possible space, SSI SCHAEFER, https://www.ssi-schaefer.com/en-in/products/order-picking/semi-automated-order-picking/batch-pickn-scan-sorter-88012, last viewed Feb. 16, 2018.

* cited by examiner

SYSTEM AND METHOD FOR AUTOMATED FULFILLMENT OF ORDERS IN A FACILITY

RELATED APPLICATION

This application claims priority to and the benefit of U.S. Provisional Application No. 62/663,450, filed on Apr. 27, 2018, which is incorporated by reference herein in its entirety.

BACKGROUND

Order fulfillment can be inefficient in the event that each order is picked when it is received. Inefficient picks of the same item may be performed by more than one picker leading to lost productivity.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein is a system for automated fulfillment of retail orders in a facility. A sorting control device aggregates orders into a master picklist. The sorting control device divides the master picklist into one or more sub-picklists based on locations at which items in the master picklist are stored. The sorting control device transmits a notification to an autonomous guided vehicle (AGV). The notification includes one or more of the sub-picklists, a location at which one of the items in the sub-picklists is stored and a location of an AGV dock of a conveyor system at which the item is to be deposited by the AGV. The AGV receives the notification and navigates to the location of the one or more items in the sub-picklists. The AGV obtains the one or more items, and then navigates to the location of the AGV dock of the conveyor system. The AGV deposits the one or more items at an inlet of the conveyor system. The conveyor system receives the items, and passes each of the items through a scan tube to be scanned. The conveyor system determines a destination isolation wing for the item based on scanning of the item via the scan tube. To transport the items to the destination isolation wing, the conveyor system actuates a subset of computer controlled rollers and a subset of actuated platforms.

Figure 1:
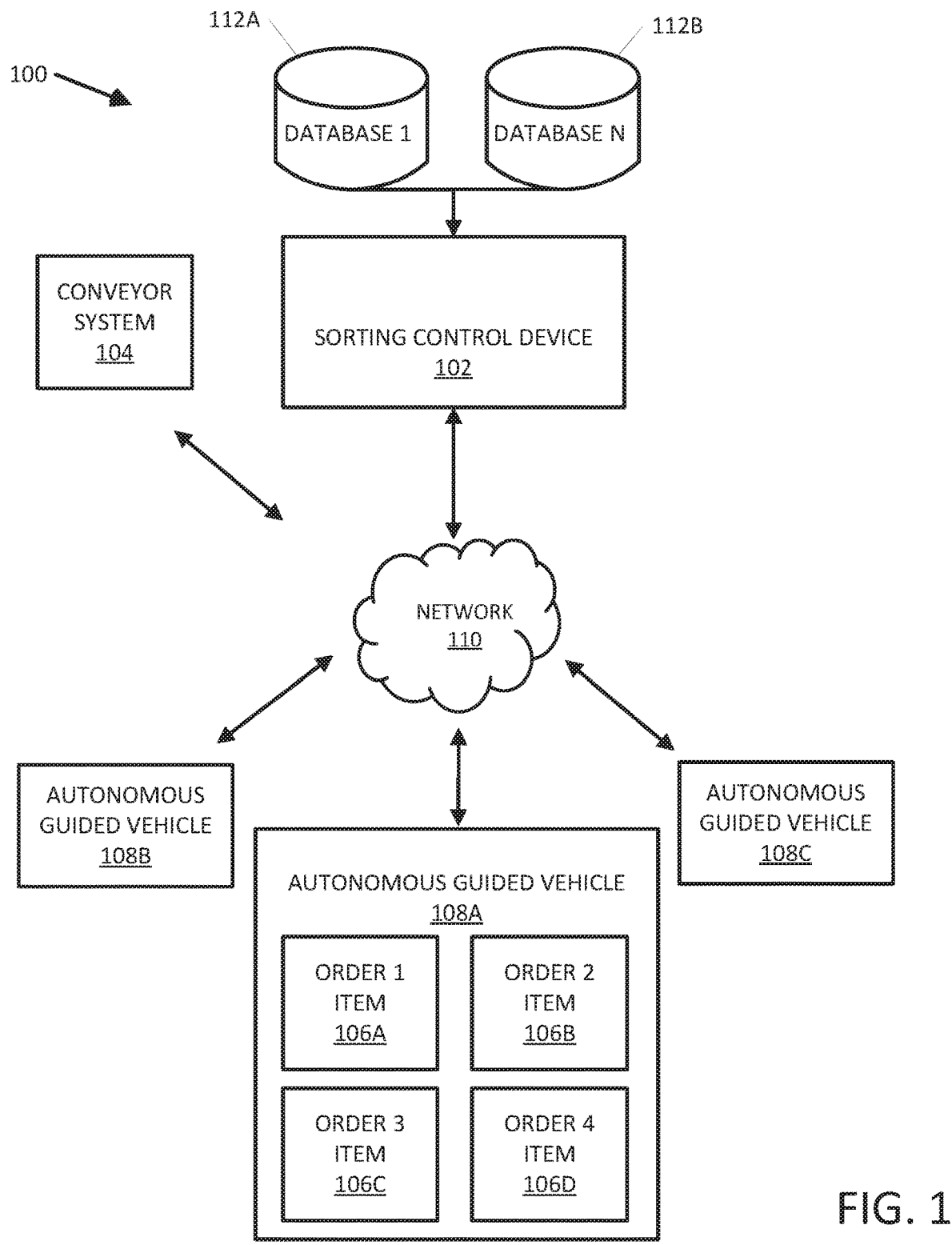
FIG. 1 is a block diagram illustrating a system for automated fulfillment of orders in a facility according to an exemplary embodiment.

FIG. 1 is a block diagram illustrating a system 100 for automated fulfillment of orders in a facility according to an exemplary embodiment. The system 100 can utilize a sorting control device 102, communicatively coupled with a conveyor system 104 and with one or more AGVs 108A-C (collectively AGVs 108) for the automated fulfillment of orders.

The sorting control device 102 can receive one or more orders. Orders can be received from an e-commerce system (formed by one or more servers) communicatively coupled to the databases 112A, 112B. The e-commerce system can update the databases 112A, 112B with order information. The sorting control device 102 can aggregate items in the received orders into a master picklist. The master picklist can include all items from the received one or more orders. In exemplary embodiments, the master picklist can be continuously and dynamically updated when order are received. The sorting control device 102 can identify a location of each of the aggregated items within a facility. As the master picklist contains one or more orders, more than one of the same item across multiple orders can exist in the picklist. The sorting control device 102 can identify duplicate items in the master picklist as well as the locations of the duplicate items and can consolidate the entry of that item within the master picklist. Each of the items in the master picklist can be referenced back to the original order from which the item originated. The referencing to the original order from which an item originated can include maintaining a list of database identifiers corresponding to the original order including the item and the insertion of the identifier into a database table corresponding to the master picklist.

The sorting control device 102 can disassemble the master picklist into location-based sub-picklist. For example, the sub-picklists can correspond to various items located in a common or nearby location within the facility (e.g., within a specified distance of each other). By organizing the master picklist into location-based sub-picklists, items in similar areas of a facility can be grouped together. The items in the master picklist can be grouped into sub-picklists independently of the orders from which the items originated, and times at which the orders including the items are received. The number of sub-picklists can be determined by the availability of AGVs as well as the capacity of the one or more AGVs 108, both volumetric and load (weight bearing). The sub-picklists can limit the size of one picklist to items within a small geographic footprint of the facility. Alternatively, sub-picklists can have broader geographic scope to maximize the use of an AGV's capacity. For example, in one embodiment, the items in a sub-picklist can include items that are nearby to each other and are on an optimized path to an input of the conveyor system (e.g., items in the same aisle). The sorting control device 102 can interface with the databases 112A, 112B to retrieve additional information about the volumetric size and weight of the items in the sub-picklists. Additionally, specifications relating to the capacity of the one or more AGVs 108 from a pool of available AGVs can be retrieved from the databases 112A, 112B for comparison to the measure of the sub-picklist items.

A conveyor system 104 can be provided a platform for receiving and sorting of the sub-picklist items into their respective orders. The conveyor system 104 can receive items from the one or more AGVs 108, singulate each of the items for processing, scan each of the items, and then transfer the item to a specific receiving area based on the order to which the item belongs. The conveyor system 104 can include computer control for controlling rollers and actuated platforms. Additional, the computer control can include network interfaces devices for interfacing with the network 110.

The one or more AGVs 108 can be autonomous robotic vehicles. The one or more AGVs 108 can include ground vehicles or unmanned aerial vehicles (UAVs). The one or more AGVs 108 can include processing systems configured to receiving navigational instructions, as well as circuitry to implement and execute the navigational instructions. The processing systems can also include obstacle detection and avoidance systems to allow the one or more AGVs 108 to execute the navigational instructions and dynamically adapt the navigation based on obstacles that can occur during navigation. The one or more AGVs 108 can include one or more motors for propulsion. In one embodiment, the motor can power a drive train that can be controlled by the processing systems to effectuate the navigation of the one or more AGVs 108. In another embodiment, one or more motors can power rotors in a UAV embodiment. The one or more AGVs 108 can interface with the inlet of the conveyor system 104.

As one example, the AGV 108A can transport order items 106A, 106B, 106C, 106D. The order items 106A, 106B, 106C, 106D correspond to those items from the master picklist that are currently picked in a sub-picklist assigned to the AGV 108A. The order items 106A, 106B, 106C, 106D can be multiples of the same item corresponding to one or more orders. Alternatively the order items 106A, 106B, 106C, 106D can be different items corresponding to one or more orders that are located within a specified distance from each other within the facility. Additionally, additional sub-picklists can be assigned to the AGV 108B specifying a different set of order items. The different set of order items can be different items from order items 106A, 106B, 106C, 106D. The different set of order items can be located in a different location of the facility from order items 106A, 106B, 106C, 106D. Alternatively, order items 106A, 106B, 106C, 106D and The different set of order items can be in the same location, however AGV 108A can be running at load capacity and AGV 108B can have additional capacity for more items from that area of the facility.

A network 110 communicatively couples the one or more AGVs 108, the sorting control device 102 and the conveyor system 104. The network 110 can be a wide area network (WAN) or the Internet. The network 110 can be operable to transport data packets compatible with sorting control device 102, the conveyor system 104, and the one or more AGVs 108. In one embodiment, compatible data packets can include data packets with transmission control protocol (TCP) or user datagram protocol (UDP) routing information, as well as an accessible application layer. The network 110 can interface with other networks or servers. The network 110 can be a combination of wired and wireless connection inclusively.

Databases 112A, 112B store relevant information about orders. The order information can include information identifying the contents of the order, the method of payment, the purchaser, as well as time and date of the order. The databases 112A, 112B store relevant information about the items in the facility such as unique identifiers, package sizes including weight and dimensions, packaging images, and locations of the item within the facility. Additionally the databases 112A, 112B can be updated with information collected from the conveyor system 104 including substation items to orders, as well as scanned or direct imaging of the items from a scan tube.

Figure 2:
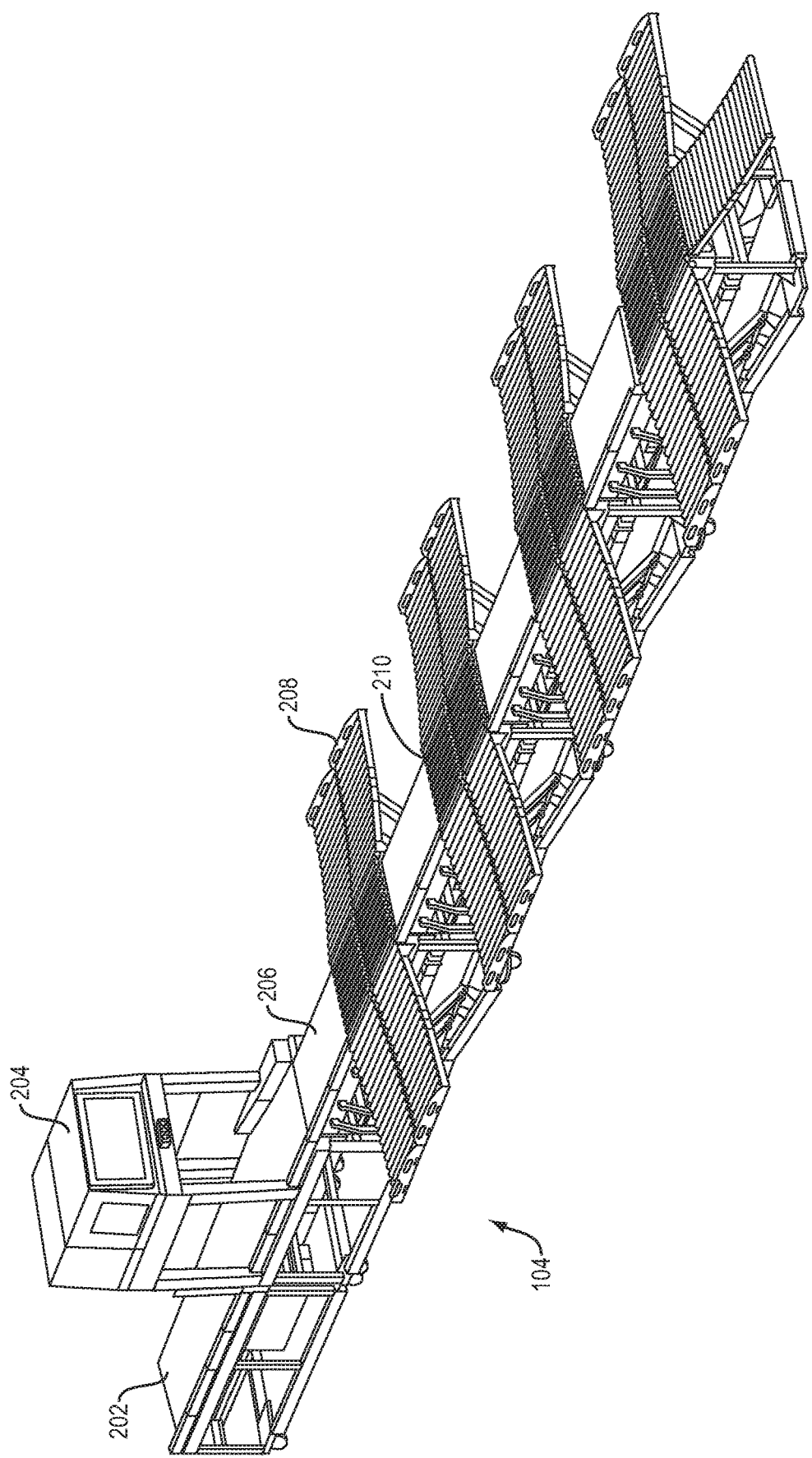
FIG. 2 is a diagram illustrating a conveyor system for automated fulfillment of retail orders in a facility according to an exemplary embodiment.

FIG. 2 is a diagram illustrating a conveyor system 104 for automated fulfillment of orders in a facility according to an exemplary embodiment. The conveyor system 104 can include an inlet 202, a scan tube 204, computer controlled rollers 206, one or more isolation wings 208 and one or more actuated platforms 210. While an illustrative quantity of isolation wings 208 are depicted in FIG. 2, the conveyor system 104 can include more or fewer isolation wings in other embodiments. The inlet 202 is the entry point for items into the conveyor system 104. The one or more AGVs 108 can interface or dock with the inlet 202 to deposit one or more items into the conveyor system 104. Computer controlled rollers 206 singulate and advance the items down the conveyor system 104. The computer controlled rollers 206 are individually activated to singulate each item. Once singulation is completed, multiple adjacent computer controlled rollers 206 can be synchronously activated to provide consistent motion of each item along the conveyor system 206.

Items can travel across the conveyor system 104 through a scan tube 204. The scan tube 204 can be positioned over the computer controlled rollers 206. The scan tube 204 can include one or more sensors to detect and identify items passing through the tube. The sensors can include a camera configured to capture and process universal product code (UPC) bar codes, quick response (QR) codes, and to capture a set of digital images of items. The sensors can also include a near field communication (NFC) tag reader.

Computer controlled rollers 206 advance an item out of the scan tube and to the actuated platforms 210. The actuated platforms 210 facilitate the transfer of an item from the computer controlled rollers 206 to one or the isolation wings 208. The actuated platforms 210 can be controlled by the conveyor system 104. Upon the scanning of an item in the scan tube 204, an order of the items on the conveyor system 104 can be determined based upon the time that the item was scanned on the conveyor system 104 and the delta between each item scan time. The conveyor system 104 can assign the item to one of the isolation wings 208. The conveyor system 104 can determine a distance to the assigned one of the isolation wings 208 based on the spacing and the circumference of each computer controlled roller 206. The conveyor system 104 can utilize the computer controlled rollers 206 to move the item to an actuated platform 210 associated with the assigned one of the isolation wings 208. The actuated platform 210 can utilize linkage attached to a computer controlled motor to raise a side of the actuated platform 210 opposite the assigned one of the isolation wings 208. The raising can utilize the force of gravity to laterally move the item off the computer controlled rollers 206 and into the assigned one of the isolation wings. In embodiments, the conveyor system 104 can include AC/DC power supply configured to receive 110-220 V alternating current power at 60 Hz and 30 A and to provide direct current power to the computer controlled rollers 206, the scan tube 204, and the actuated platforms 210.

Figure 3A:
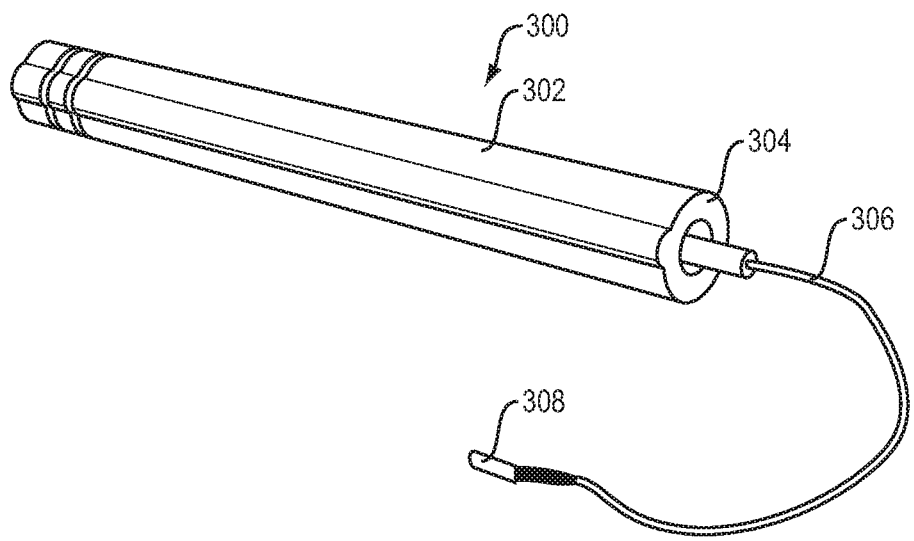
FIGS. 3A and 3B depict a computer controlled roller according to an exemplary embodiment.
Figure 3B:
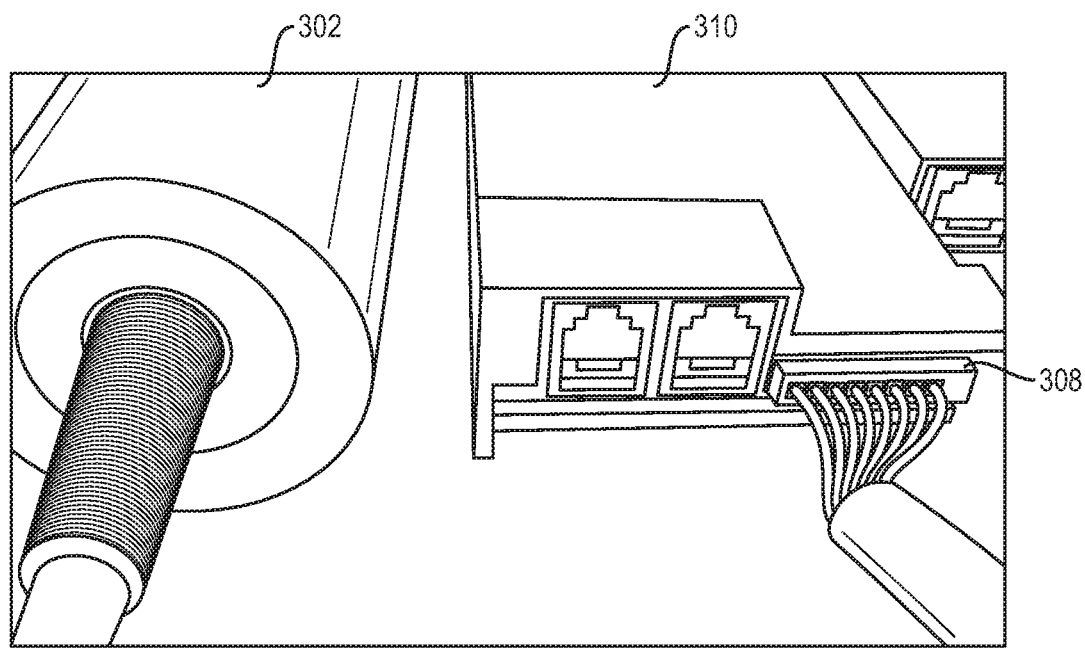

FIGS. 3A and 3B depict a computer controlled roller 300 according to an exemplary embodiment. The computer controlled roller 300 can be a 24-volt direct current (DC) driven O-ring roller. The roller 300 can include a body 302, and an internal or external motor 304. The motor 304 can be powered and/or controlled via cable 306, which can be operably coupled to a control card 310. The computer controlled roller 300 can be coupled to the control card 310 through the connector 308. In embodiments, two or more rollers 300 can be operably coupled to a single control card 310. In other embodiments, each roller 300 can be operably coupled to a distinct control card 310. The computer controlled roller 300 can include other conveyance mechanisms known in the art, including belt-driven rollers, magnetic belts, flat belts, chains or the like, provided that computer controlled rollers 300 are capable of maintaining a conveyor speed of at least about 110 feet per minute.

Figure 3C:
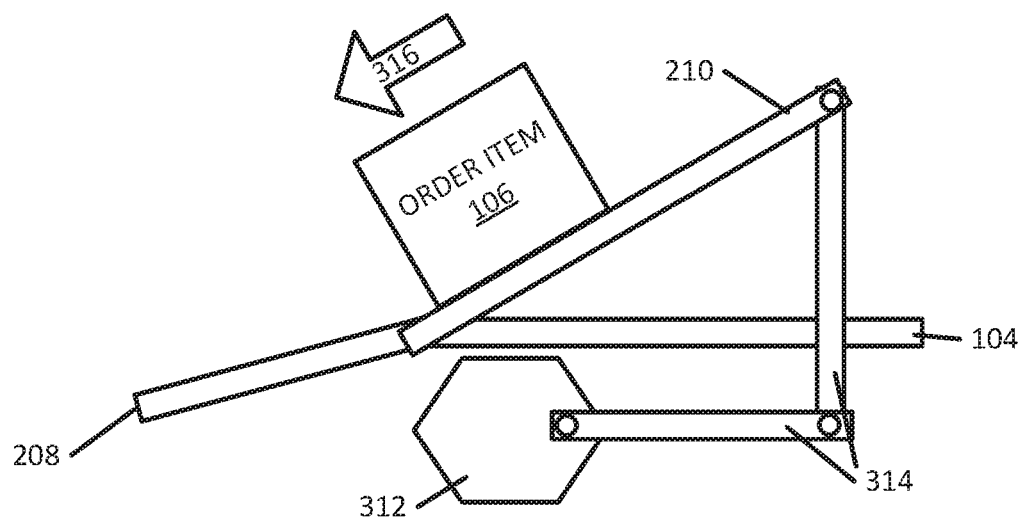
FIG. 3C depicts an actuated platform according to an exemplary embodiment.

FIG. 3C depicts an actuated platform 210 according to an exemplary embodiment. The actuated platform 210 can include a computer controlled motor 312 and accompanying linkage 314 to facilitate the raising and lowering of the actuated platform 210. The computer controlled motor 312 can be communicatively coupled to a controller computer. The controller computer can activate the motor 312 when it is determined that an order item 106 destined for the designated isolation wing 208 is determined to be located on the actuated platform 210. The linkage 314 converts the motors rotational movement into a vertical movement to raise one side of the actuated platform 210. The raising of one side of the actuated platform 210 can create a gravitational effect in the direction 316 toward the designated isolation wing 208. The order item 106 can be captured by the gravitational effect and moves in the direction 316 into the designated isolation wing. Upon the traversal of the order item 106 from the actuated platform 210 to the designated isolation wing 208, the computer controller can activate the motor in the opposite direction, thereby lowering the actuated platform 210 through the linkage 314 so that other order items can pass.

Figure 4:
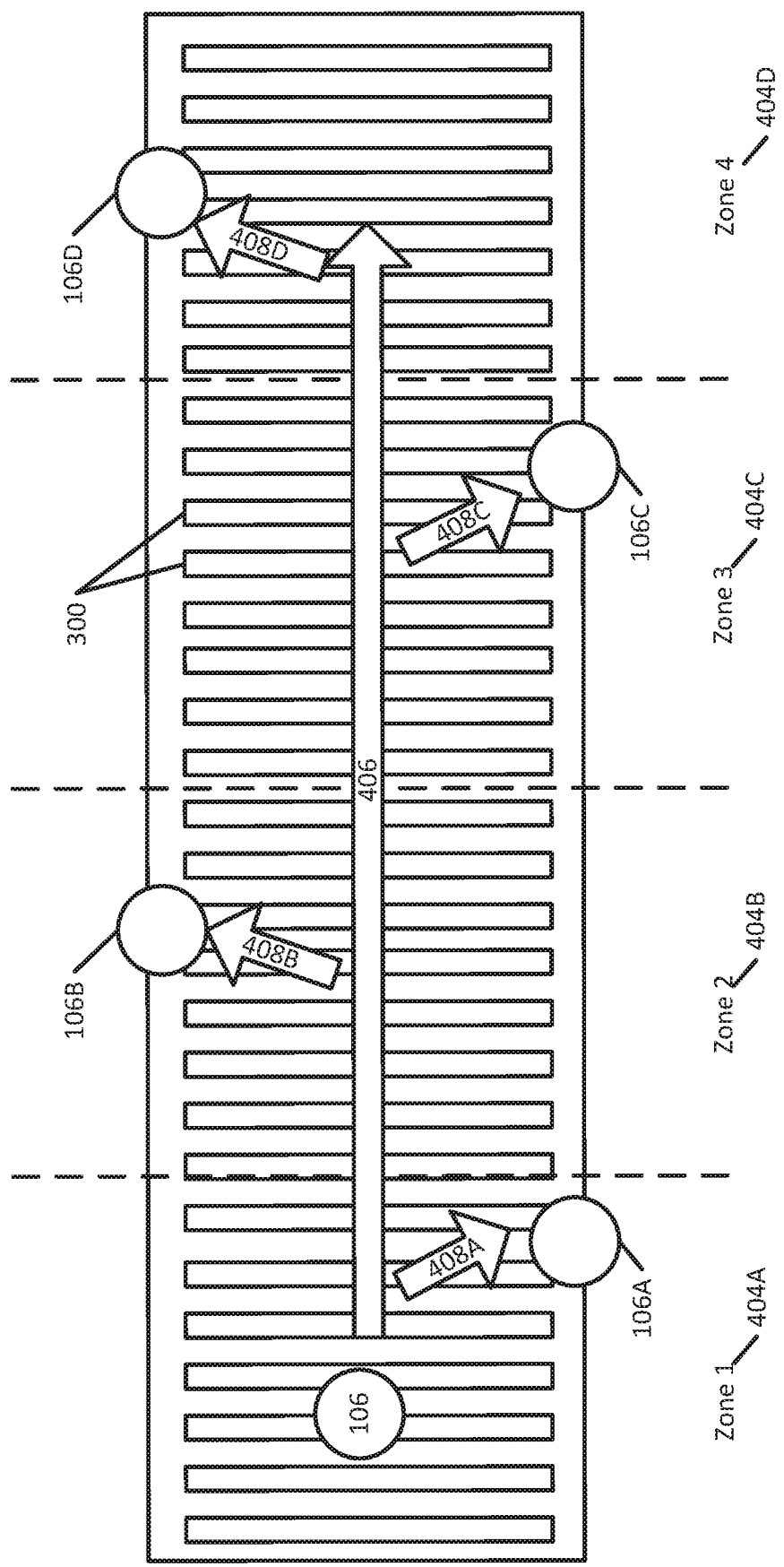
FIG. 4 is a block diagram illustrating processing of items on a conveyor system according to an exemplary embodiment.

FIG. 4 is a block diagram illustrating processing of items on a conveyor system according to an exemplary embodiment.

An item 106 traverses the conveyor system by computer controlled rollers 300 in a direction 406 along a length of the conveyor system. Zones 404A, 404B, 404C, 404D correspond to actuated platforms associated with isolation wings 208. When the item enters one of the designated zones 404A, 404B, 404C, 404D corresponding to the isolation wing 208 assigned to the order that includes the item, the actuated platform 210 raises a side opposite the isolation wing 208 resulting in a movement of the item towards the corresponding one of the designated zones 408A, 408B, 408C, 408D in a generally lateral or transverse direction as compared to the direction 406.

Figure 5:
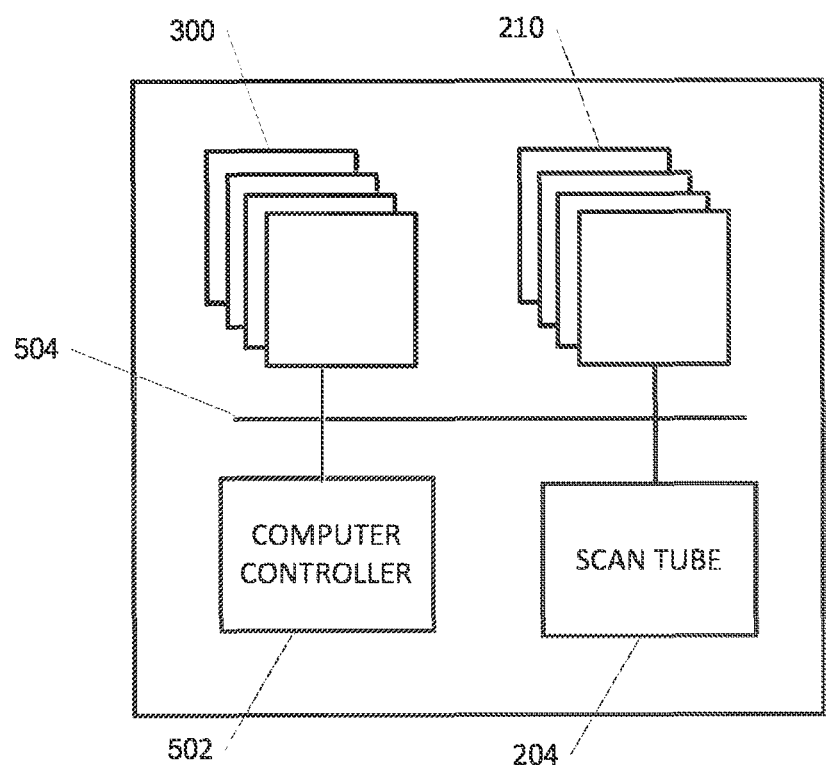
FIG. 5 is a block diagram of an exemplary conveyor system according to an exemplary embodiment.

FIG. 5 is a block diagram of an exemplary conveyor system according to an exemplary embodiment. The conveyor system 104 can include two or more computer controlled rollers 300. In one embodiment, the number of computer controlled rollers 300 present in the conveyor system 104 can be a function of the length of the conveyor as well as the number of isolation wings the conveyor system services.

The conveyor system 104 can include a plurality of actuated platforms 210. In an embodiment with more than one isolation wing the actuated platforms 210 can correspond in a one to one relationship with the isolation wings, where the actuated platform 210 redirects an item in one direction toward the correlated isolation wing. In another embodiment, the plurality of actuated platforms 210 may correspond in a one to two relationship where the actuated platform can direct an item in opposite directions where isolation wings are on opposite sides of the conveyor system 104.

The conveyor system 104 can include a scan tube 204. The scan tube 204 can be positioned inline to the computer controlled rollers 300 on the conveyor system 104. During usage, items can traverse the conveyor system 104, passing through the scan tube 204 prior to proceeding to the actuated platforms 210. As described above, the scan tube 204 scans items passing through it via machine-readable tags or direct imaging.

The conveyor system 104 can include a computer controller 502. The computer controller 502 can instruct individual computer controlled rollers 300 to rotate to advance or singulate items on the conveyor system 104. The computer controller 502 additionally can instruct individual actuated platforms 210 to raise or lower thereby advancing an item to a designated isolation wing. The computer controller 502 can control the scan tube 204 including the scanning of items, and transmission of the scanned information or images to the sorting control device 102. A bus 504 can connect the computer controlled rollers 300, actuated platforms 210 and the scan tube 204 to the computer controller 502. The bus 504 facilitates to the electrical and electromechanical control of the respective components by the computer controller 502.

Figure 6:
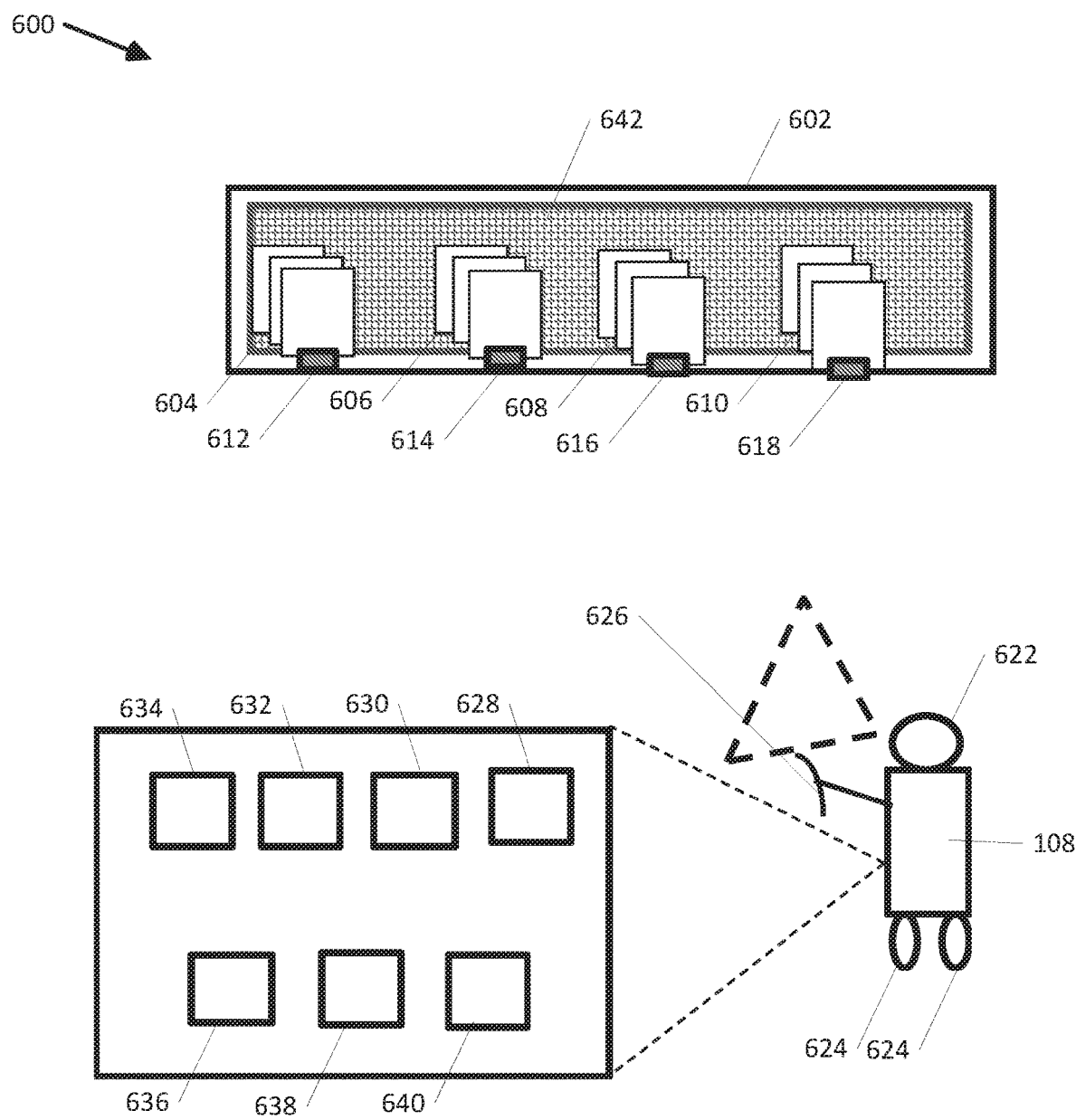
FIG. 6 is a block diagram illustrating an AGV in an autonomous robot fulfillment system according to exemplary embodiment.

FIG. 6 is a block diagram illustrating an embodiment of an AGV 108 in a facility according to exemplary embodiments of the present disclosure. In exemplary embodiments, sets of items 604-610 can be disposed in a facility 600 on a shelving unit 602, where each set of like items 604-610 can be grouped together on the shelving unit 602. The physical objects in each of the items 604-610 can be associated with identifiers encoded in machine-readable element 612-618, respectively, corresponding to the items 604-610, where like items can be associated with identical identifiers and disparate physical objects can be associated with different identifiers. In some embodiments, the machine-readable elements 612-618 can be barcodes or QR codes.

The AGV 108 can be a driverless vehicle, an unmanned aerial craft, automated conveying belt or system of conveyor belts, and/or the like. Embodiments of the AGV 108 can include an image capturing device 622, motive assemblies 624, a picking unit 626, a controller 628, an optical scanner 630, a drive motor 632, a GPS receiver 634, accelerometer 636 and a gyroscope 638, and can be configured to roam autonomously through the facility 600. The picking unit 126 can be an articulated arm. The AGV 108 can be an intelligent device capable of performing tasks without human control. The controller 628 can be programmed to control an operation of the image capturing device 622, the optical scanner 630, the drive motor 632, the motive assemblies 624 (e.g., via the drive motor 632), in response to various inputs including inputs from the image capturing device 622, the optical scanner 630, the GPS receiver 634, the accelerometer 636, and the gyroscope 638. The drive motor 632 can control the operation of the motive assemblies 624 directly and/or through one or more drive trains (e.g., gear assemblies and/or belts). In this non-limiting example, the motive assemblies 624 are wheels affixed to the bottom end of the AGV 108. The motive assemblies 624 can be but are not limited to wheels, tracks, rotors, rotors with blades, and propellers. The motive assemblies 624 can facilitate 360 degree movement for the AGV 108. The image capturing device 622 can be a still image camera or a moving image camera.

The GPS receiver 634 can be an L-band radio processor capable of solving the navigation equations in order to determine a position of the AGV 108, determine a velocity and precise time (PVT) by processing the signal broadcasted by GPS satellites. The accelerometer 636 and gyroscope 638 can determine the direction, orientation, position, acceleration, velocity, tilt, pitch, yaw, and roll of the AGV 108. In exemplary embodiments, the controller can implement one or more algorithms, such as a Kalman filter, for determining a position of the autonomous robot device.

Sensors 642 can be disposed on the shelving unit 602. The sensors 642 can include temperature sensors, pressure sensors, flow sensors, level sensors, proximity sensors, biosensors, image sensors, gas and chemical sensors, moisture sensors, humidity sensors, mass sensors, force sensors and velocity sensors. At least one of the sensors 642 can be made of piezoelectric material as described herein. The sensors 642 can be configured to detect a set of attributes associated with the physical objects in the sets of like items 604-610 disposed on the shelving unit 102. The set of attributes can be one or more of: quantity, weight, temperature, size, shape, color, object type, and moisture attributes.

The AGV 108 can receive instructions to retrieve physical objects from the sets of like items 604-610 from the facility 600. For example, the AGV 108 can receive instructions to retrieve a predetermined quantity of physical objects from the sets of like items 604-610. The instructions can include identifiers associated with the sets of like items 604-610. The AGV 108 can query a database to retrieve the designated location of the set of like items 604-610. The AGV 108 can navigate through the facility 100 using the motive assemblies 124 to the set of like items 604-610. The AGV 108 can be programmed with a map of the facility 600 and/or can generate a map of the first facility 600 using simultaneous localization and mapping (SLAM). The AGV 108 can navigate around the facility 600 based on inputs from the GPS receiver 628, the accelerometer 630, and/or the gyroscope 632.

Subsequent to reaching the designated location(s) of the set of like items 604-610, the AGV 108 can use the optical scanner 630 to scan the machine-readable elements 612-618 associated with the set of like items 604-610 respectively. In some embodiments, the AGV 108 can capture an image of the machine-readable elements 612-618 using the image capturing device 622. The autonomous robot device can extract the machine-readable element from the captured image using video analytics and/or machine vision.

The AGV 108 can extract the identifier encoded in each machine-readable element 612-618. The identifier encoded in the machine-readable element 612 can be associated with the set of like items 604 and the identifier encoded in the machine-readable element 614 can be associated with the set of like items 604-610. The AGV 108 can compare and confirm the identifiers received in the instructions are the same as the identifiers decoded from the machine-readable elements 612-618. The AGV 108 can capture images of the sets of like items 604-610 and can use machine vision and/or video analytics to confirm the set of like items 604-610 are present on the shelving unit 602. The AGV 108 can also confirm the set of like items 604-610 include the items associated with the identifiers by comparing attributes extracted from the images of the set of like items 604-610 in the shelving unit and stored attributes associated with the items 604-610.

The AGV 108 can pick up a specified quantity of physical objects from each of the sets of like items 604-610 from the shelving unit 602 using the picking unit 626. The AGV 108 can carry the physical objects it has picked up to a different location in the facility 600 and/or can deposit the physical objects on an autonomous conveyor belt for transport to a different location in the store.

The sensors 642 can detect when a change in a set of attributes regarding the shelving unit 602 in response to the AGV 108 picking up the set of like items 604-610. For example, the sensors can detect a change in quantity, weight, temperature, size, shape, color, object type, and moisture attributes. The sensors 642 can detect the change in the set of attributes in response to the change in the set of attributes being greater than a predetermined threshold. The sensors 642 can encode the change in the set of attributes into electrical signals. The sensors can transmit the electrical signals to a computing system.

Figure 7:
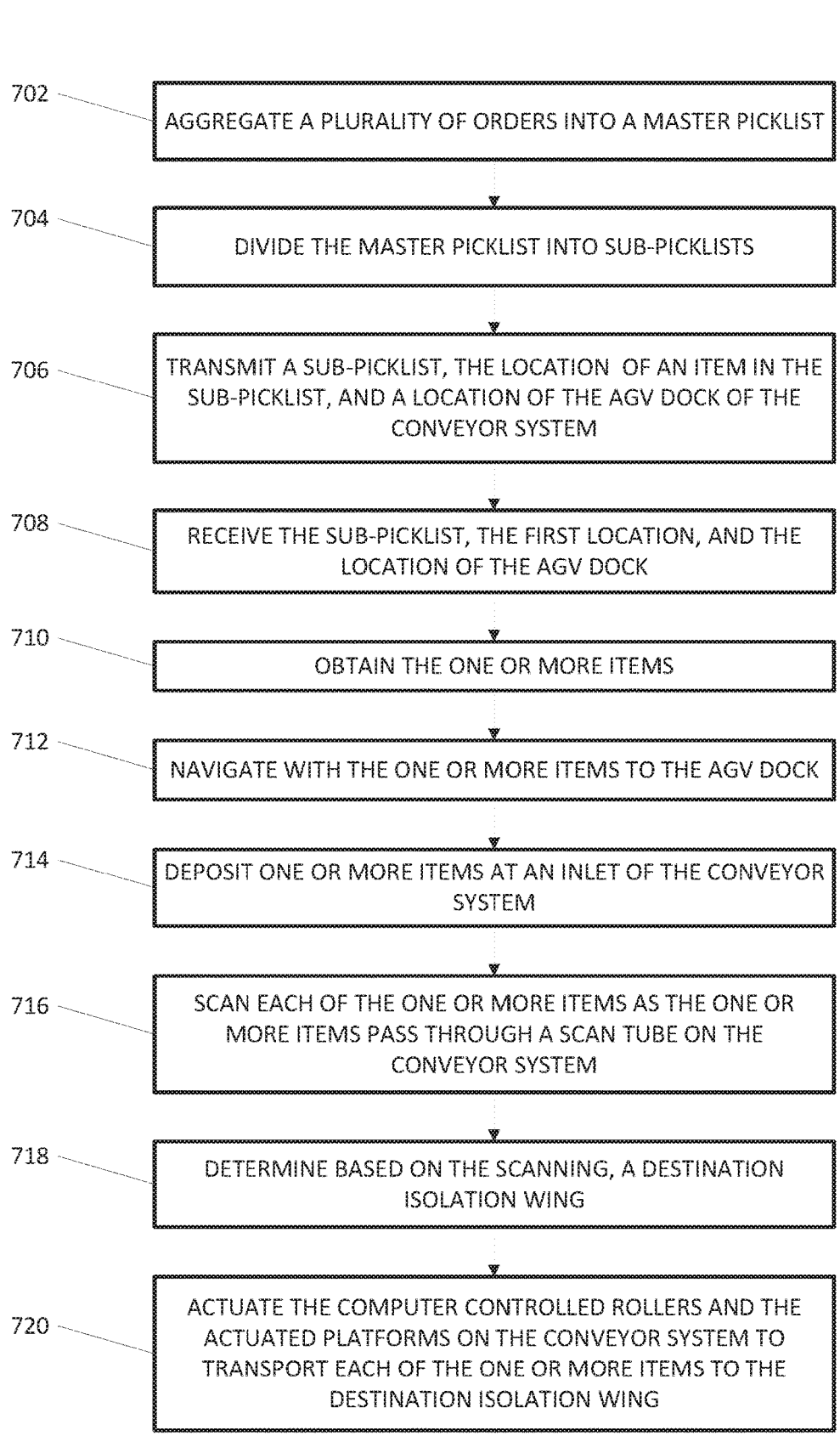
FIG. 7 is a flow diagram illustrating a process for automated fulfillment of orders in a facility according to an exemplary embodiment.

FIG. 7 is a flow diagram illustrating a system for automated fulfillment of orders in a facility according to an exemplary embodiment.

At step 702, the sorting control device aggregates items in a plurality of orders into a master picklist. As discussed above, the sorting control device can receive orders from an e-commerce system. The order items can be aggregated into a master picklist.

At step 704, the sorting control device divides the master picklist into sub-picklists. The master picklist can be divided into sub-picklists based on the location of items within a facility. Items located within predetermined distances from one another can be included in the sub-picklist. Alternatively, sub-picklists can be determined based on availability of AGVs as well as the item capacity of an available AGV. Additionally, the number of orders aggregated into the master picklist at any instance in time can be limited by the number of isolation wings on the conveyor system.

At step 706, the sorting control device transmits a sub-picklist, the locations of items in the sub-picklist, and a location of the AGV dock of the conveyor system to a selected one of the AGVs. The sorting control device packages and encodes the sub-picklist as well as relevant location information for the retrieval of the items in the sub-picklist, as well as the delivery point of the conveyor system.

At step 708, the AGV receives the sub-picklist, the first location, and the location of the AGV dock. The AGV receives the encoded package, decodes the package and extracts the sub-picklist as well as relevant location information for the retrieval of the items in the sub-picklist, as well as the delivery point of the conveyor system At step 710, the AGV autonomously navigates to the locations of the one or more items, and obtains the one or more items from the locations. For example, the AGV travels to the first item location and retrieves the item. The retrieval, in one embodiment, can be user-assisted, where a user stationed at the location identifies the item and places the item in or on the AGV. Alternatively, AGV inclusive collection methods with cameras and sensors can be used to identify the product and robotic instruments can be utilized to retrieve the identified item. Upon retrieving the item, the AGV can query the sub-picklist for the next nearest item. Upon retrieving the next nearest item, the AGV can retrieve corresponding location information either from the sub-picklist, or through a separate query to the databases 112A, 112B. The AGV can navigate to the corresponding location and retrieve the item using methods described previously. The AGV iterates the sub-picklist until all items or substitute items have been retrieved.

At step 712, the AGV navigates with the one or more items to the AGV dock. Upon obtaining the items in the sub-picklist, the AGV navigates to the conveyor system dock utilizing the location of the AGV dock previously received.

At step 714, the AGV deposits one or more items at an inlet of the conveyor system. The conveyor system can actuate, responsive to receiving the plurality of items, a subset of the individually computer controlled rollers to singulate each of the plurality of items. The conveyor system can activate individual computer controlled rollers to move an item without disturbing another item on the conveyor system. The movement of individual items allows the conveyor system to obtain a uniform arrangement of the items, such that items have a similar amount of empty space around each item.

At step 716, the conveyor system scans each of the one or more items as the one or more items pass through a scan tube on the conveyor system. The scan tube updates, responsive to the scanning, an order from the plurality of orders, with a set of images taken of the plurality of items. Additionally, the scan tube can update, responsive to the scanning, an order from the plurality of orders, indicating that an item from the order has been scanned at the scan tube.

At step 718, the conveyor system determines, based on the scanning, a destination isolation wing. The conveyor system utilizes the scanning to identify the item. The item can be correlated to one of the orders received from the e-commerce system. Each order can be assigned an isolation wing to avoid the comingling of orders. The conveyor system activates respective computer controlled rollers to advance the items to their respective isolation wings.

At step 720, the conveyor system actuates the computer controlled rollers and the actuated platforms to transport each of the one or more items to the destination isolation wing. As the items progress across the computer controlled rollers, the conveyor system calculates the distance the item has traveled based at least in part on the spacing of the computer controlled rollers, the circumference of the computer controlled rollers, as well as the sequence and speed at which the computer controlled rollers are operated. Additional sensors can be utilized to detect the position of the item on the conveyor system. Weight sensors, pressure sensors, as well as imaging sensors can be used to detect the items on the conveyor.

As the item approaches the designated isolation wing, the conveyor system activates the actuated platform. The side of the actuated platform can be raised through a motor and linkage so that the force of gravity forces the item into the isolation wing.

Figure 8:
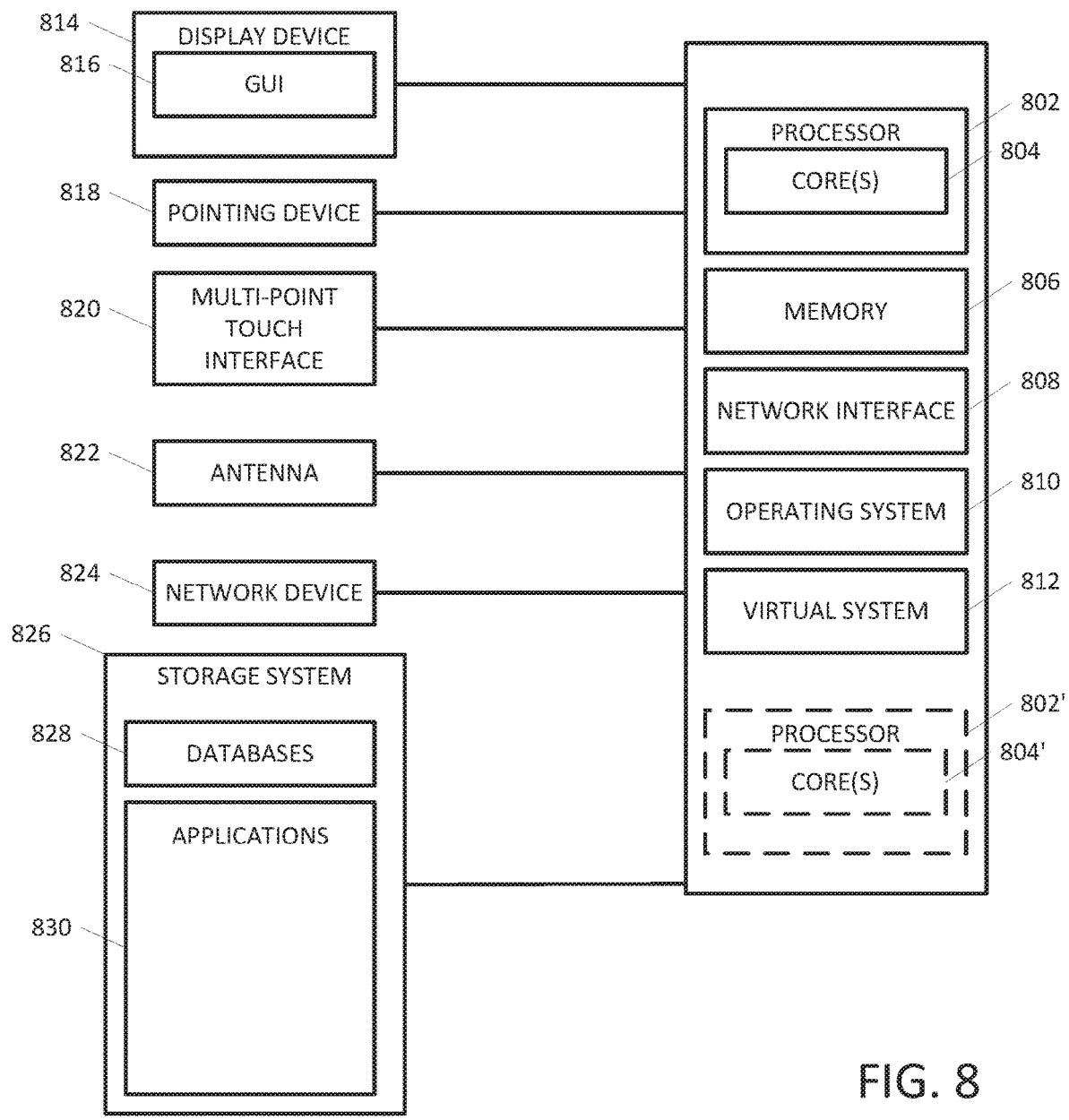
FIG. 8 depicts a block diagram of an exemplary computing device in accordance with an exemplary embodiment.

FIG. 8 is a block diagram of an example computing device for implementing exemplary embodiments of the present disclosure. Embodiments of the computing device 800 can implement embodiments of a system for the automated fulfillment of retail orders in a facility. For example, the computing device can be embodied as a portion of the sorting control device, the autonomous guided vehicle, and computer controller of the conveyor system. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 806 included in the computing device 800 may store computer-readable and computer-executable instructions or software for implementing exemplary operations of the computing device 800. The computing device 800 also includes configurable and/or programmable processor 802 and associated core(s) 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for implementing exemplary embodiments of the present disclosure. Processor 802 and processor(s) 802' may each be a single core processor or multiple core (804 and 804') processor. Either or both of processor 802 and processor(s) 802' may be configured to execute one or more of the instructions described in connection with computing device 800.

Virtualization may be employed in the computing device 800 so that infrastructure and resources in the computing device 800 may be shared dynamically. A virtual machine 812 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof. The computing device 800 can receive data from input/output devices. A user may interact with the computing device 800 through a visual display device 814, such as a computer monitor, which may display one or more graphical user interfaces 816, multi touch interface 820 and a pointing device 818.

The computing device 800 may also include one or more storage devices 826, such as a hard-drive, CD-ROM, or other computer-readable media, for storing data and computer-readable instructions and/or software that implement exemplary embodiments of the present disclosure. For example, exemplary storage device 826 can include one or more databases 828 for storing information relating to the orders, the master picklist, the sub-picklist and locations of items. The databases 828 may be updated manually or automatically at any suitable time to add, delete, and/or update one or more data items in the databases.

The computing device 800 can include a network interface 808 configured to interface via one or more network devices 824 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 822 to facilitate wireless communication (e.g., via the network interface) between the computing device 800 and a network and/or between the computing device 800 and other computing devices. The network interface 808 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

The computing device 800 may run any operating system 810, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 800 and performing the operations described herein.

In exemplary embodiments, the operating system 810 may be run in native mode or emulated mode. In an exemplary embodiment, the operating system 810 may be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components, or steps can be replaced with a single element, component, or step. Likewise, a single element, component, or step can be replaced with multiple elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further, still, other aspects, functions, and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts and that the steps in the exemplary flowcharts can be performed in a different order than the order shown in the illustrative flowcharts.

We claim:

1. A system for the automated fulfillment of retail orders in a facility comprising:
   a conveyor system at a facility, the conveyor system comprising a plurality of individually computer controlled rollers, a plurality of actuated platforms, one or more isolation wings, a scan tube, and inlet;
   a sorting control device communicatively coupled to the conveyor system configured to:
   aggregate a plurality of retail orders received at the facility, each retail order comprising one or more items, into a master picklist including all the items in the plurality of retail orders;
   divide the master picklist into a plurality of sub-picklists based on a location of one or more items in the master picklist, each sub-picklist of items corresponding to a different area of the facility where items on the sub-picklist of items are stored;
   transmit a first one of the plurality of sub-picklists and a first location associated with the first one of the plurality of the sub-picklists;
   wherein the conveyor system is configured to:
   receive the items included in the master picklist at the inlet;
   scan each of the items included in the master picklist as the items pass through the scan tube;
   determine, based on the scanning, a destination isolation wing from the one or more isolation wings for each of the items included in the master picklist based on the plurality of retail orders;
   actuate a subset of the plurality of individually computer controlled rollers and a subset of the plurality of actuated platforms to transport each of the items included in the master picklist to the determined destination isolation wing; and
   direct items in each individual retail order of the plurality of retail orders to the same destination isolation wing.

2. The system of claim 1, wherein the scan tube comprises a camera configured to capture and process at least one of a universal product code (UPC) bar code, a quick response (QR) code, and a set of images taken of the items included in the master picklist.

3. The system of claim 2, wherein the scan tube is further configured to:
   update, responsive to the scanning, a retail order from the plurality of retail orders, with a set of images taken of the items included in the master picklist.

4. The system of claim 1, wherein the scan tube comprises a near field communication (NFC) tag reader.

5. The system of claim 1, wherein the scan tube is further configured to:
   update, responsive to the scanning, a retail order from the plurality of retail orders, indicating that an item from the retail order has been scanned at the scan tube.

6. The system of claim 1, wherein each of the plurality of sub-picklists correspond to items located in a common location within the facility.

7. The system of claim 1, further configured to actuate, responsive to receiving the items included in the master picklist, the subset of the plurality of individually computer controlled rollers to singulate each of the items included in the master picklist.

8. The system of claim 1, further comprising:
   an AGV communicatively coupled to the sorting control device and configured to:
   receive the first one of the plurality of sub-picklists and the first location associated with the first one of the plurality of the sub-picklists from the sorting control device;
   obtain one or more items in the first one of the plurality of sub-picklists from the first location; and
   transfer the one or more items to the inlet associated with the conveyor system.

9. A method for the automated fulfillment of retail orders in a facility comprising:
   aggregating a plurality of retail orders received at the facility, each retail order comprising one or more items, into a master picklist including all the items in the plurality of retail orders;
   dividing the master picklist into a plurality of sub-picklists based on a location of one or more items in the master picklist, each sub-picklist of items corresponding to a different area of the facility where items on the sub-picklist of items are stored;
   transmitting a first one of the plurality of sub-picklists and a first location associated with the first one of the plurality of the sub-picklists;
   receiving the items included in the master picklist at an inlet of a conveyor system;
   scanning each of the items included in the master picklist as the items pass through a scan tube on the conveyor system;
   determining based on the scanning, a destination isolation wing from one or more isolation wings of the conveyor system for each of the items included in the master picklist based on the plurality of retail orders; and
   actuating a subset of a plurality of individually computer controlled rollers and a subset of a plurality of actuated platforms on the conveyor system to transport each of the items included in the master picklist to the determined destination isolation wing;

directing items in each individual retail order of the plurality of retail orders to the same destination isolation wing.

10. The method of claim 9, wherein the scan tube comprises a camera configured to capture and process at least one of a universal product code (UPC) bar code, a quick response (QR) code, and a set of images taken of the items included in the master picklist.

11. The method of claim 10, further comprising:
updating, responsive to the scanning, a retail order from the plurality of retail orders, with a set of images taken of the items included in the master picklist.

12. The method of claim 9, wherein the scan tube comprises a near field communication (NFC) tag reader.

13. The method of claim 9, further comprising:
updating, responsive to the scanning, a retail order from the plurality of retail orders, indicating that an item from the retail order has been scanned at the scan tube.

14. The method of claim 9, wherein each of the plurality of sub-picklists correspond to items located in a common location within the facility.

15. The method of claim 9, further comprising actuating, responsive to receiving the items included in the master picklist, the subset of the plurality of individually computer controlled rollers to singulate each of the items included in the master picklist.

16. The method of claim 9, further comprising:
receiving the first of the plurality of sub-picklists and the first location associated with the first one of the plurality of the sub-picklists;
obtaining one or more items in the first one of the plurality of sub-picklists from the first location;
transferring the one or more items to the inlet associated with the conveyor system.

17. A non-transitory computer-readable medium the automated fulfillment of retail orders in a facility, having stored thereon, instructions that when executed in a computing system, cause the computing system to perform operations comprising:
aggregating a plurality of retail orders received at the facility, each retail order comprising one or more items, into a master picklist including all the items in the plurality of retail orders;
dividing the master picklist into a plurality of sub-picklists based on a location of one or more items in the master picklist, each sub-picklist of items corresponding to a different area of the facility where items on the sub-picklist of items are stored;
transmitting a first one of the plurality of sub-picklists and a first location associated with the first one of the plurality of the sub-picklists;
receiving the items included in the master picklist at an inlet of a conveyor system;
scanning each of the items included in the master picklist as the items pass through a scan tube on the conveyor system;
determining based on the scanning, a destination isolation wing from one or more isolation wings of the conveyor system for each of the items included in the master picklist based on the plurality of retail orders; and
actuating a subset of a plurality of individually computer controlled rollers and a subset of a plurality of actuated platforms on the conveyor system to transport each of the items included in the master picklist to the determined destination isolation wing;
directing items in each individual retail order of the plurality of retail orders to the same destination isolation wing.

18. The medium of claim 17, wherein the scan tube comprises a camera configured to capture and process at least one of a universal product code (UPC) bar code, a quick response (QR) code, and a set of images taken of the items included in the master picklist.

19. The medium of claim 18, further comprising:
updating, responsive to the scanning, a retail order from the plurality of retail orders, with a set of images taken of the items included in the master picklist.

20. The medium of claim 17, further comprising:
updating, responsive to the scanning, a retail order from the plurality of retail orders, indicating that an item from the retail order has been scanned at the scan tube.

* * * * *